United States Patent [19]
Bodiker, II et al.

[11] Patent Number: 6,163,950
[45] Date of Patent: *Dec. 26, 2000

[54] METHOD OF ALIGNING SMALL COMPONENTS USING SELF-ALIGNING END EFFECTOR

[75] Inventors: Thomas Carl Bodiker, II, Engelwood, Ohio; John Philip Hollowell, Fremont, Calif.

[73] Assignee: International Business Machines Corporation, Armonk, N.Y.

[ * ] Notice: Under 35 U.S.C. 154(b), the term of this patent shall be extended for 00 days.

[21] Appl. No.: 09/420,354

[22] Filed: Oct. 18, 1999

Related U.S. Application Data

[62] Division of application No. 09/191,946, Nov. 13, 1998.

[51] Int. Cl.⁷ .................................................. B23Q 7/00
[52] U.S. Cl. .............................................. 29/559; 29/743
[58] Field of Search ............................ 29/740, 743, 759, 29/464, 559, 834; 294/64.1; 414/627; 901/40

[56] References Cited

U.S. PATENT DOCUMENTS

| | | | |
|---|---|---|---|
| 3,676,911 | 7/1972 | Austin | 29/740 |
| 4,473,247 | 9/1984 | Itemadani et al. | 29/740 |
| 4,553,322 | 11/1985 | Cappos et al. | 29/759 |
| 4,599,037 | 7/1986 | Ross, Jr. et al. | 29/740 |
| 4,703,965 | 11/1987 | Lee et al. | |
| 4,705,311 | 11/1987 | Ragard | |
| 4,753,004 | 6/1988 | Fujioka | |
| 4,822,091 | 4/1989 | Vermeer et al. | 29/740 |
| 4,950,011 | 8/1990 | Borcea et al. | 29/743 |
| 5,050,919 | 9/1991 | Yakou | |
| 5,207,465 | 5/1993 | Rich | 29/743 |
| 5,231,753 | 8/1993 | Tanaka et al. | 29/743 |
| 5,572,785 | 11/1996 | Tveit | |
| 5,870,820 | 2/1999 | Arakawa et al. | 29/740 |
| 5,953,812 | 9/1999 | Ferrante | 29/740 |

FOREIGN PATENT DOCUMENTS

| | | | |
|---|---|---|---|
| 3-155200 | 7/1991 | Japan | 29/743 |
| 1407802 | 7/1988 | U.S.S.R. | |
| 1109152 | 4/1968 | United Kingdom | |
| 2087348A | 5/1982 | United Kingdom | |

*Primary Examiner*—David P. Bryant
*Attorney, Agent, or Firm*—Douglas R. Millett; Felsman, Bradley, Vaden, Gunter & Dillon, LLP

[57] ABSTRACT

A self-aligning end effector is mounted to a robot for transferring a magnetic read/write head from a feeder to an assembly fixture. The robot positions the end effector above the head. A hollow needle extends from the end effector adjacent to the head. A vacuum is applied through the needle to draw the head to the end of the needle and the end effector is lifted away from the feeder. As the robot moves the end effector toward the assembly fixture, a nest with an alignment locator is lowered onto the head. The locator has tapered sides for orienting the head in a precise alignment. An upper surface of the head seats against a flat surface when it is aligned. The vacuum holds the head on the end effector throughout this operation. The nest is then withdrawn from the head so that it is again located on the end of the needle. When the end effector is located above the assembly fixture, the head is released into the assembly fixture by turning off the vacuum.

5 Claims, 2 Drawing Sheets

METHOD OF ALIGNING SMALL COMPONENTS USING SELF-ALIGNING END EFFECTOR

"This is a Continuation-in-Part or Division of application Ser. No. 09/191,946, filed Nov. 13, 1998, currently pending."

TECHNICAL FIELD

This invention relates in general to assembling head gimbal assemblies and in particular to a robotic end effector with self-aligning capability.

BACKGROUND ART

In the automated assembly of head gimbal assemblies (HGA's) for hard disk drives, an industrial robot is used to pick up a magnetic read/write head from a feeder nest. The robot uses an end effector consisting of a hollow needle through which is drawn a vacuum. Due to the minute size of the head, tolerance build up in the feeder nest and robot positioning, it is not possible to pick up a head accurately enough to place it directly into an assembly fixture.

In the prior art, several methods of accurately locating the head in relation to the robot end effector have been used. In one method, the edges of the head are lightly bumped against a fixed edge while holding the head on the end of the needle with a vacuum. This method is time consuming and slows the assembly process. Another method uses a vision system to locate the head in relation to the robot end effector. Although this system is faster than the bumping method, vision systems are complex and relatively expensive. A fast, cost effective method for aligning a magnetic read/write head during automated assembly is needed.

DISCLOSURE OF THE INVENTION

A self-aligning end effector is mounted to a robot for transferring a magnetic read/write head from a feeder to an assembly fixture. The robot positions the end effector above the head. A hollow needle extends from the end effector adjacent to the head. A vacuum is applied through the needle to draw the head to the end of the needle and the end effector is lifted away from the feeder. As the robot moves the end effector toward the assembly fixture, a nest with an alignment locator is lowered onto the head. The locator has tapered sides for orienting the head in a precise alignment. An upper surface of the head seats against a flat surface when it is aligned. The vacuum holds the head on the end effector throughout this operation. The nest is then withdrawn from the head so that it is again located on the end of the needle. When the end effector is located above the assembly fixture, the head is released into the assembly fixture by turning off the vacuum.

BEST MODE FOR CARRYING OUT THE INVENTION

Figure 1:
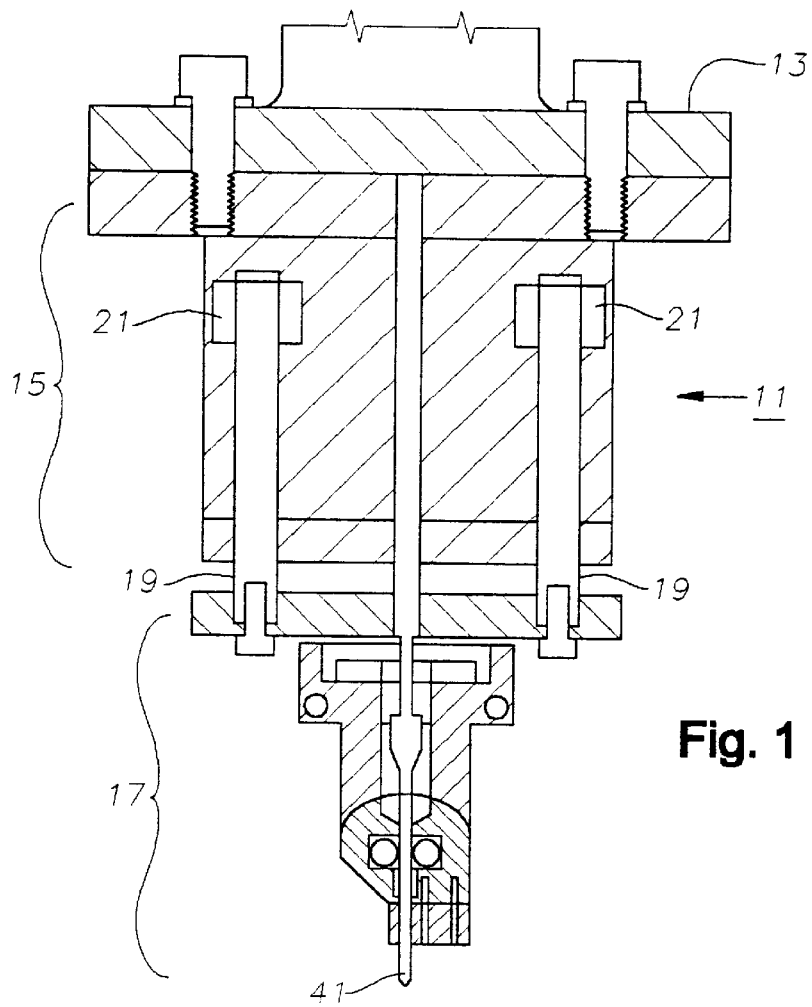
FIG. 1 is a sectional side view of an end effector constructed in accordance with the invention.

Referring to FIG. 1, an end effector 11 is mounted to the arm of a four-axis industrial robot 13. End effector 11 has a base 15 and an alignment locator or block 17 located below base 15. Base 15 is mounted directly to the lower end of the arm of robot 13 and is stationary relative to it. A set of pneumatic cylinders 21 are located in base 15 and may be remotely actuated to move alignment block 17 vertically relative to base 15 with pistons 19.

Figure 2:
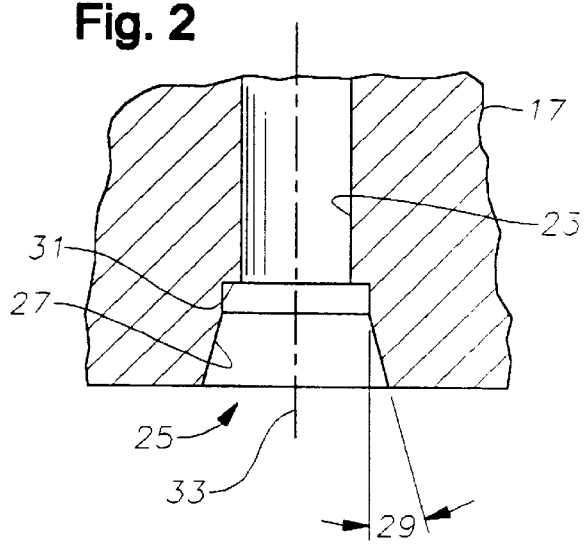
FIG. 2 is an enlarged sectional side view of an alignment block of the end effector of FIG. 1.
Figure 3:
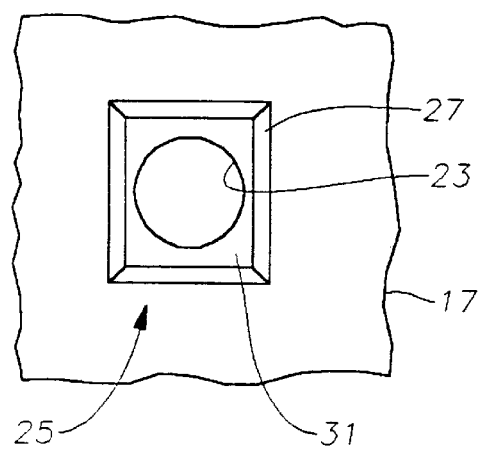
FIG. 3 is an enlarged bottom view of the alignment block of FIG. 2.

As shown in FIGS. 2 and 3, the distal end of alignment block 17 has a hole 23 extending therethrough and an alignment nest 25 at the lower end of hole 23. Nest 25 has a square opening 27 with a taper 29. In the preferred embodiment, opening 27 comprises four polygonal sidewalls and taper 29 is 15 degrees. A horizontal square landing surface 31 is located between opening 27 and hole 23. An axis 33 of hole 23 is perpendicular to and located in the center of landing surface 31. In alternate embodiments (not shown), opening 27 and landing surface 31 may comprise different shapes such as a rectangle, circle or polygon, depending on the shape of the component to be manipulated.

Figure 4:
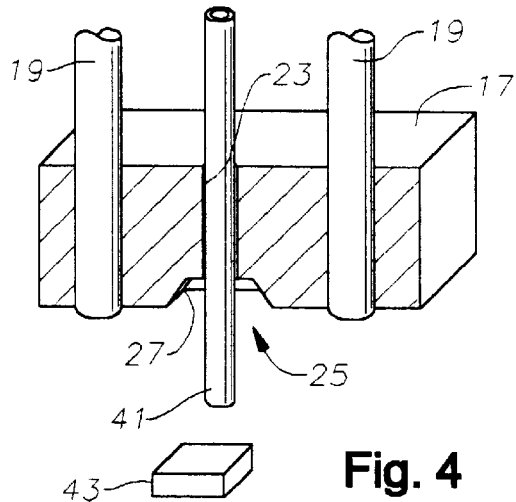
FIG. 4 is a schematic, partial sectional isometric view of the alignment block of FIG. 2 shown prior to use.

Referring now to FIGS. 1 and 4, a tube or needle 41 extends through base 15 and hole 23 in alignment block 17. In the preferred embodiment, needle 41 and end effector 11 are insulated or grounded to protect objects that they contact from electrostatic discharge. Needle 41 is rigidly mounted to base 15 and is stationary relative thereto. Needle 41 has a flat lower end and an outer diameter which is slightly smaller than the diameter of hole 23. Needle 41 is hollow and is selectively evacuated by a remotely operated vacuum.

In operation, end effector 11 is designed to transfer a magnetic read/write slider or head 43 (FIG. 4) from a feeder (not shown) to an assembly fixture (not shown). Note that FIGS. 4–7 are merely schematic drawings which have been greatly simplified to enhance understanding of the invention. In the embodiment shown, head 43 is a flat square block and nest 25 is precisely shaped and sized for its unique specifications.

Figure 5:
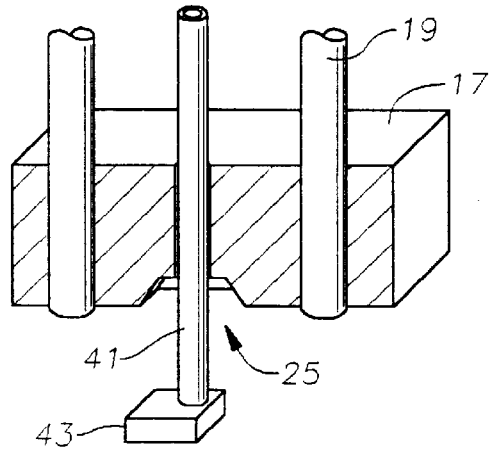
FIG. 5 is a schematic, partial sectional isometric view of the alignment block of FIG. 2 at an initial step of operation.

In the initial step (FIG. 4), needle 41 extends from alignment block 17 as robot 13 positions end effector 11 above head 43. Robot 13 lowers end effector 11 toward head 43 until needle 41 is immediately adjacent to it. A vacuum is remotely actuated and applied through needle 41 to draw head 43 to the end of needle 41 (FIG. 5). When needle 41 first engages head 43, head 43 will not be centered and squarely aligned with needle 41. After needle 41 picks up head 43, end effector 11 is moved away from the feeder.

Figure 6:
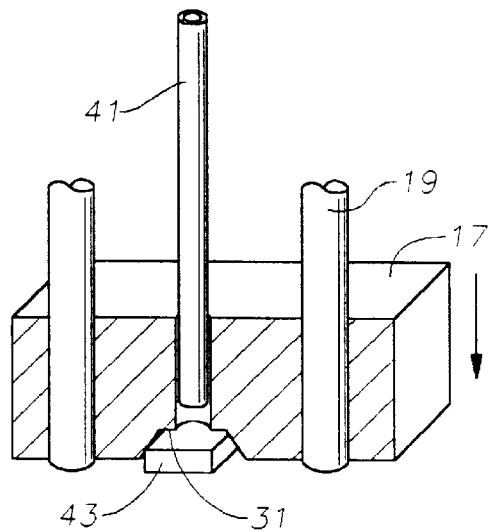
FIG. 6 is a schematic, partial sectional isometric view of the alignment block of FIG. 2 at an intermediate step of operation.

As robot 13 moves end effector 11 toward the assembly fixture, alignment block 17 is lowered to an aligning position relative to needle 41 and head 43 such that head 43 is seated into nest 25 (FIG. 6). Opening 27 of nest 25 is significantly larger than the outer dimensions of head 43 so that it can accommodate a severely misaligned head 43. As head 43 enters opening 27, opening 27 and taper 29 force head 43 toward the center of needle 41 so that head 43 is precisely aligned for placement into the assembly fixture. The upper surface of head 43 seats flat against landing surface 31 when block 17 is reaches the aligning position. In the aligning position, landing surface 31 is located below the end of needle 41 (FIG. 6) so that needle 41 is withdrawn into hole 23. Landing surface 31 has side dimensions which are approximately equal to the side dimensions of head 43 to facilitate its precise alignment. At this point, head 43 is momentarily detached from needle 41. However, the vacuum being drawn through needle 41 continues to hold head 43 in nest 25 throughout this operation.

Figure 7:
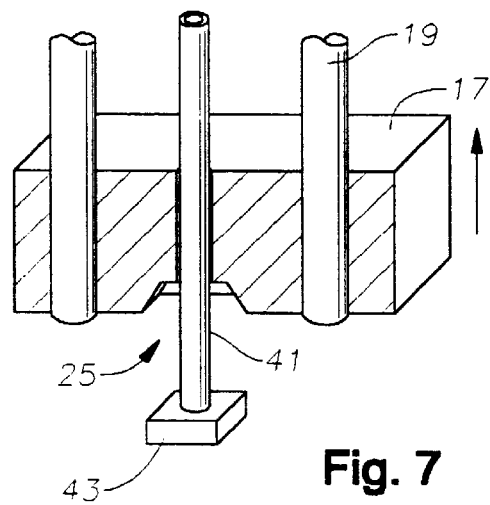
FIG. 7 is a schematic, partial sectional isometric view of the alignment block of FIG. 2 at a final step of operation.

After head 43 is properly centered and aligned in nest 25, block 17 is raised so that head 43 is again perched on the lower end of needle 41 (FIG. 7). Block 17 is further raised from head 43 until a desired separation from nest 25 is attained. When end effector 11 is located immediately adjacent to the assembly fixture, head 43 is released into the assembly fixture by remotely terminating the vacuum being drawn through needle 41. Robot 13 then returns end effector 11 to its starting position. This automated operation may be repeated as necessary for additional assemblies.

The invention has several advantages. The end effector picks up, precisely aligns and centers, and then releases a component with a single toolhead which integrates these operations. The end effector may be modified for use with components of various shapes and sizes including surface mount technology card assemblies. This invention is much faster than the traditional bumping alignment method and is relatively inexpensive compared to vision alignment systems.

While the invention has been shown or described in only some of its forms, it should be apparent to those skilled in the art that it is not so limited, but is susceptible to various changes without departing from the scope of the invention. For example, instead of using the fixed square opening in the alignment block a set of active, spring-loaded jaws may be used to collapse around the magnetic head and align it while it is on the needle.

We claim:

1. A method for aligning a component during an automated assembly process, comprising:

(a) providing a base with an alignment member having a recess and a hole in the recess for accommodating an engagement member extending therethrough;
 (b) moving the base so that the engagement member is adjacent to the component;
 (c) picking up the component with an end of the engagement member;
 (d) moving one of the alignment member and the engagement member relative to the other such that the component enters the recess and aligns relative to the engagement member;
 (e) moving said one of the alignment member and the engagement member such that the end of the engagement member detaches from the component while the component is maintained in the recess and the alignment member extends beyond the end of the engagement member;
 (f) moving the base such that the component is adjacent to an assembly fixture; and then
 (g) releasing the component into the assembly fixture.

2. The method of claim 1, further comprising the step of tapering the recess to facilitate entry and alignment of the component relative to the engagement member.

3. The method of claim 1 wherein step (d) comprises moving the alignment member relative to the engagement member.

4. The method of claim 1, further comprising the step of forming tapered sidewalls and a backstop in the recess for orienting the component relative to the engagement member so that an upper surface of the component seats against the backstop when the component is aligned.

5. The method of claim 1 wherein step (c) comprises evacuating the engagement member to pick up the component, and wherein step (g) comprises terminating the vacuum in the engagement member to release the component.

* * * * *